United States Patent
Ranjan et al.

(10) Patent No.: US 10,375,010 B1
(45) Date of Patent: Aug. 6, 2019

(54) SELECTION OF MULTI-CHANNEL COMMUNCIATIONS

(71) Applicant: Amazon Technologies, Inc., Seattle, WA (US)

(72) Inventors: Roopesh Ranjan, Redmond, WA (US); Graton Marshal Randal Gathright, Mukilteo, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 313 days.

(21) Appl. No.: 15/345,320

(22) Filed: Nov. 7, 2016

(51) Int. Cl.
*H04L 12/58* (2006.01)
*H04L 29/08* (2006.01)

(52) U.S. Cl.
CPC ............ *H04L 51/36* (2013.01); *H04L 67/306* (2013.01)

(58) Field of Classification Search
CPC . H04L 63/08; H04L 5/0053; H04L 2463/082; H04L 63/0428; H04L 63/1408; H04L 51/34; H04L 12/1827; H04L 12/1831; H04L 27/2602; H04L 41/5038; H04L 43/062; H04L 43/0864; H04L 43/50; H04L 45/123; H04L 47/283; H04L 47/722; H04L 65/4038; H04L 65/4076; H04L 65/607; H04L 67/306; H04L 65/602; H04L 67/02; H04L 47/15; H04L 67/025; H04L 67/04; H04L 67/10; H04L 67/125; H04L 67/303; H04L 67/34; H04L 27/2695; H04L 41/22; H04L 51/00; H04L 67/32; H04L 12/185; H04L 25/0208; H04L 25/0212; H04L 25/0222; H04L 27/0014; H04L 27/2657; H04L 27/2662; H04L 27/2672; H04L 27/2675; H04L 29/06

See application file for complete search history.

(56) References Cited

U.S. PATENT DOCUMENTS

| | | | | |
|---|---|---|---|---|
| 2004/0061718 | A1* | 4/2004 | Fitzpatrick | H04L 51/04 715/758 |
| 2008/0305815 | A1* | 12/2008 | McDonough | H04L 51/38 455/466 |
| 2011/0158398 | A1* | 6/2011 | Kannan | H04L 12/1827 379/265.09 |

(Continued)

*Primary Examiner* — Djenane M Bayard
(74) *Attorney, Agent, or Firm* — Knobbe, Martens, Olson & Bear, LLP

(57) ABSTRACT

Systems and methods are described for selecting recipients, channels, and messages for delivery via multi-channel communications. A message may be delivered to a recipient via multiple delivery channels, and the recipient may engage in a conversion event or activity associated with the message. Each potential delivery of the message may be associated with an incremental probability of causing the conversion event. The incremental probabilities may be used to determine the channel and recipient with the highest incremental probability of causing a conversion event for a given message, the recipient and message having the highest incremental probability of causing a conversion event when delivered via a given channel, and other combinations. Profiles may be used to compare messages, channels, and recipients in order to predict incremental probabilities, and messaging resources may be allocated according to budgets, cost-benefit analyses, or other criteria.

24 Claims, 10 Drawing Sheets

(56) References Cited

U.S. PATENT DOCUMENTS

| | | | |
|---|---|---|---|
| 2013/0151493 A1* | 6/2013 | Roth | H04N 21/2343 |
| | | | 707/703 |
| 2014/0074587 A1 | 3/2014 | Briggs | |
| 2015/0220971 A1 | 8/2015 | Raj et al. | |
| 2016/0098735 A1 | 4/2016 | Sinha et al. | |
| 2016/0155143 A1 | 6/2016 | Hsiao et al. | |

* cited by examiner

SELECTION OF MULTI-CHANNEL COMMUNCIATIONS

Generally described, communications may take place over a variety of channels. Communications channels may include, for example, one-way and one-to-many channels such as television, radio, newspapers, magazines, billboards, paper mail, and other media. Communications channels may also include online and interactive channels, such as email, the web, search engines, social media, instant messaging, audio or video streaming, podcasts, interactive software (e.g., games and product demos), and the like. Messages may be communicated via printed media, through receivers such as television sets and radios, or via personal computing devices such as laptops, tablets, smartphones, wearables and other such computing devices.

A message may be sent and received via more than one communications channel. For example, a message informing the users of a networked computing service of a security breach, and advising them to change their passwords, may be sent via email, a banner on a support website, a blog post, and a news article. As a further example, a consumer may hear a product advertisement on the radio, receive a sponsored listing for the same product in search results, and see a video clip of the product on a social network. However, some of these channels may have little to no influence on the behavior of the recipient, while other channels may have a more significant effect.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1A:
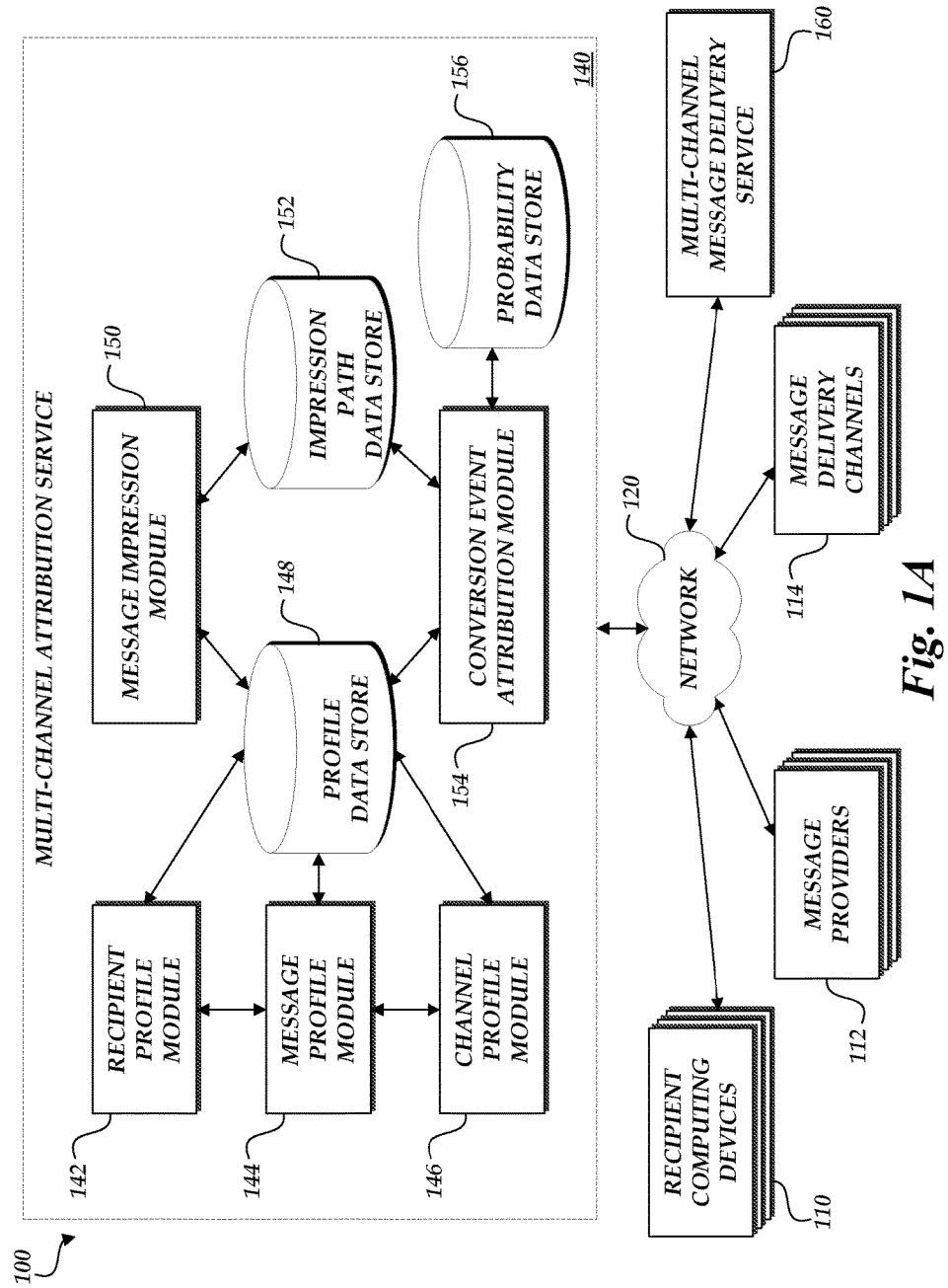
FIGS. 1A and 1B depict schematic block diagrams of illustrative network topologies including recipient computing devices, message providers, message delivery channels, a multi-channel attribution service, and a multi-channel message delivery service.

Generally described, aspects of the present disclosure relate to multi-channel communications. More specifically, aspects of the present disclosure relate to systems, methods, and computer-readable media related to apportioning shared credit for delivering a message effectively among each of the channels used to communicate the message, and for determining which combinations of channel, message, and recipient are most likely to result in effective communication. Illustratively, a message provider may deliver, or provide for the delivery of, a message to one or more recipients. The message provider may intend that the message produce a desired response from the recipient, and the message may be measured in terms of its effectiveness in causing the desired response. For example, the message may encourage users of a networked computing service to enable two-factor authentication to secure their access to the service. The message's effectiveness may thus be measured in terms of how many recipients activate two-factor authentication. As a further example, a message may advertise a product or service, and delivery effectiveness may be measured in terms of a number or percentage of recipients who purchase the product or service. The effectiveness of a message may generally be referenced throughout in terms of conversions or conversion events, where a conversion indicates the message caused the recipient to engage in an activity, use or acquire a product or service, respond to the message, or otherwise perform an action in accordance with the message provider's purpose in sending the message.

A message may be delivered via multiple channels, which may have different characteristics with regard to conversions. For example, a mass media channel may deliver a message to a large number of recipients, but may not guarantee delivery to any particular recipient, and thus the role of the channel in any particular conversion must be determined indirectly. As a further example, a channel may deliver a message to a recipient who does not pay attention to messages from that channel (e.g., the recipient treats messages via that channel as "spam," background noise, or otherwise disregards them), and so messages delivered to that recipient via that channel are unlikely to result in conversion. A channel's influence may also vary depending on the message. For example, a podcast about the outdoors may have a strong influence on its listeners when delivering messages about camping equipment, but minimal influence when delivering messages about office supplies. The influence of a channel may further be affected by prior receipt of the same message via other channels. For example, an email newsletter may be more effective at converting a recipient after the recipient views a sponsored search result featuring the same message or a related message. As a result, some message providers may be unable to accurately determine the degree to which any particular channel was responsible for converting a recipient. Such message providers may thus be unable to allocate resources efficiently when selecting message delivery channels.

To enable more efficient use of delivery channels and of message provider resources, a message provider may utilize a multi-channel message delivery service. Illustratively, the multi-channel message delivery service determines which channels to use for a particular message and recipient, which messages to deliver given a particular recipient and channel, which recipients to contact given a particular channel and message, and various combinations thereof.

A multi-channel delivery service, as described herein, may rely on a multi-channel attribution service to attribute credit for past conversions to the various channels participating in message delivery. The multi-channel attribution service may be implemented separately or as a component of the multi-channel delivery service. In some embodiments, the multi-channel attribution service may generate and store profiles for various channels, messages, and recipients, in order to enable predictive attributions for entities having similar characteristics to previously profiled entities.

The multi-channel attribution service may obtain information regarding conversion events. In some embodiments, the multi-channel attribution service may obtain conversion events directly from recipient computing devices. For example, the recipient may use a recipient computing device to generate a response to the message, and transmit the response to the multi-channel attribution service. In other embodiments, the multi-channel attribution service may obtain conversion events from a third party, such as a message provider. Still further, in some embodiments, the operator of the multi-channel attribution service may operate other networked services that receive or detect conversion events. For example, the operator of the multi-channel attribution service may also operate an e-commerce platform, a data center, a networked computing resource, or other service that may detect conversions and report them to the multi-channel attribution service. In various embodiments, the multi-channel attribution service may obtain information regarding conversion events dynamically (e.g., as the events occur), periodically (e.g., in a daily or weekly report), or on demand.

The multi-channel attribution service may further obtain and store information regarding message impressions. Generally described, an impression refers to a particular instance of a recipient receiving a message via a channel. For example, an impression may be a person seeing the message in a television commercial or on a billboard, reading the message on a web page or via email, listening to the message via the radio or a podcast, or various other combinations of a particular recipient, message, and channel. In some embodiments, an impression may also include the date and time at which the recipient received the message. The multi-channel attribution service may store information regarding multiple impressions as an impression path, which captures the various channels involved in delivering a particular message to a recipient. An impression path may, for example, include that recipient Alice received three impressions of message #1, and may include the date, time, and channel of each of the three impressions. In some embodiments, the multi-channel attribution service may store the order in which the impressions occurred. The multi-channel attribution service may generate and update impression paths when obtaining new impressions, or may generate an impression path upon receipt of a conversion event.

The multi-channel attribution service may further obtain, generate, and/or store profiles of messages, recipients, and/or channels. The profiles may contain characteristics that allow comparison between entities. For example, a message profile may contain information regarding the content of the message, such as a product or an activity featured in the message. The message profile may further contain information regarding the product or activity, or regarding a conversion event associated with the message, product, or activity. For example, a message profile for a first message may indicate that the message is an advertisement for a particular brand of shoe, and the associated conversion event is a purchase of the shoe. A second message profile may describe a second message as an advertisement for a different brand of shoe, and the associated conversion event as a purchase of the other shoe. The multi-channel attribution service may compare the two message profiles, determine a degree of similarity between them, and determine channels or recipients for the second message based on the degree of similarity between the messages. As a further example, a recipient profile may indicate that the recipient is most receptive (i.e., most likely to generate a conversion event) when a message is delivered via a support page, least receptive when a message is delivered by email, is more receptive of messages about downtime, and less receptive of messages about network security. In some embodiments, recipient profiles may include demographics, purchasing or browsing histories, or other features that enable comparisons between recipients.

A channel profile may contain information that characterizes the channel and its performance with regard to particular message and/or subscriber characteristics. For example, a channel profile may indicate than an audio channel is least effective when the message contains detailed technical information, and most effective when the message is short and easily remembered. A channel profile may further indicate that the channel is effective with recipients who share particular characteristics or demographics. For example, a profile for a streaming audio channel may indicate that the channel is more effective with joggers and other recipients who exercise regularly. Channel profiles may further indicate characteristics that change, such as a television channel whose audience may have different demographics depending on the time of day and the program being aired.

The multi-channel attribution service may thus receive information regarding a conversion event that involves a particular recipient, identify a message or messages corresponding to the event, obtain or generate an impression path that includes receipt of the messages by the recipient via various channels, and determine an attribution for each impression. An attribution may generally be described as an increase or uplift in a probability of conversion, and may be determined for the overall impression path, and/or on a per-channel or per-impression basis. For example, the multi-channel attribution service may receive notice of a conversion event involving Bob, an employee of Company X. The multi-channel attribution service may determine that the conversion event corresponds to message #2, which Company X sent to employees to encourage registering for health benefits during an enrollment window. The multi-channel attribution service may then obtain impressions data regarding instances of Bob receiving message #2 through various channels. Illustratively, the impressions data may indicate that Bob received message #2 via a corporate e-newsletter, an email, a banner on an intranet web page, and a post to an internal message board. The multi-channel attribution service may combine the impressions to generate an impressions path, which includes information about the instances of Bob receiving message #2. The impressions path may illustratively be time-bound (e.g., containing only impressions that occurred within the past two weeks) or limited to a specified number of impressions. In some embodiments, the multi-channel attribution service may receive an impressions path directly rather than receiving data regarding individual impressions and generating the path.

The multi-channel attribution service may then determine a probability of conversion (i.e., a probability of the conversion event taking place) given the recipient and the impressions path. Illustratively, the probability of conversion for a given recipient and impressions path may be determined using equation (1) below.

$$\log\left(\frac{p}{1-p}\right) = \beta_0 + \sum_{i=1}^{k}\sum_{j=1}^{c}\beta_{ij} \times f_{ij} + \sum_{i=1}^{k}\sum_{j=1}^{c}\delta_{ij} \times d_{ij} + \gamma^T \times x \quad (1)$$

In equation (1), p denotes the probability of the conversion event, $f_{ij}$ is an indicator variable representing whether the $i^{th}$ impression in the impressions path took place via the $j^{th}$ channel, $d_{ij}$ denotes a characterization of each impression-channel interaction (duration, interactivity, and so forth), x denotes a characterization of the recipient, 'k' denotes the total number of impressions in the impressions path, and 'c' denotes the total number of channels by which impressions in the impressions path were made. The parameters $\beta_0$, $\beta_{ij}$, $\delta_{ij}$, and $\gamma^T$ may illustratively be estimated using maximum likelihood estimation, based on a number of prior impressions whose conversion outcomes are known. One skilled in the art will also appreciate that many variations on equation (1) fall within the scope of the present disclosure. For example, one or more of the terms $\beta_0$, $\beta_{ij}$, $\delta_{ij}$, $d_{ij}$, $\gamma^T$, and x may be replaced by zero, one, or another constant.

The multi-channel attribution service may further determine a probability of conversion given the recipient and a subset of the impressions path. Illustratively, the multi-channel attribution service may generate a plurality of subpaths from the impressions path, each of which contains a different subset of the impressions in the impressions path. For example, if an impressions path includes five impressions, in which Bob receives message #2 via (1) a first email, (2) a web page, (3) an e-newsletter, (4) a message board, and (5) a second email, then the multi-channel attribution service may generate five subpaths. The first subpath may include impressions (2), (3), (4), and (5); the second subpath may include impressions (1), (3), (4), and (5); the third subpath may include impressions (1), (2), (4), and (5); and so forth. The multi-channel attribution service may then use equation (1) to determine probabilities of conversion $p_1$, $p_2$, $p_3$, $p_4$, and $p_5$ for the respective subpaths.

The multi-channel attribution service may then estimate an uplift, or incremental probability of conversion, due to a particular impression. Illustratively, the uplift for impression j may be determined using equation (2) below.

$$L_j = \begin{cases} p - p_j, & \text{if } p > p_j \\ 0, & \text{otherwise} \end{cases} \quad (2)$$

In equation (2), $L_j$ denotes the uplift attributed to impression j, p denotes the probability of conversion given the full impressions path, and $p_j$ denotes the probability of conversion given a subpath with impression j removed. By using equation (2) to estimate uplift for a particular impression, the multi-channel attribution service determines that each impression makes either an increase or no contribution to the possibility of conversion. In alternative embodiments, the multi-channel attribution service estimates a probability of conversion delta using the simplified equation $L_j = p - p_j$, which may lead to a determination that a particular impression decreased the probability of conversion. Additionally, in some embodiments, the multi-channel attribution service may divide $L_j$ by the conversion probability p to determine and attribute uplifts as a percentage of a conversion.

In some embodiments, the multi-channel attribution service may determine the uplift for an impression by adding the impression to an impression path that lacks it, rather than removing the impression from an impression path that contains it. Such an approach may be useful, for example, when determining the uplift of a potential impression given a set of impressions that have already occurred. The multi-channel attribution service may alternatively or additionally start with an empty impression path, determine a probability of conversion in the absence of any impressions, and then determine uplifts by adding impressions to the impression path.

In further embodiments, the multi-channel attribution service may determine the incremental probability of conversion for an impression based on its position in a sequence of impressions. For example, as discussed above, the multi-channel attribution service may determine that an impression delivered via email is more effective when it follows an impression delivered via sponsored search results. The multi-channel attribution service may illustratively analyze past impressions and conversions to compare impression paths in which impression A precedes impression B, A follows B, A and B occur within a relatively short time period, and so forth in order to identify patterns that correspond with a higher (or lower) incremental probability of conversion. In further embodiments, the multi-channel attribution service may identify other relationships between impressions that increase or decrease the uplift of a particular impression, and may determine, for example, an uplift associated with multiple impressions in a particular sequence or timeframe. In still further embodiments, the multi-channel attribution service may identify dependencies between impressions. For example, the service may determine that a first impression delivered via channel X changes the likelihood that a subsequent impression delivered via channel X will occur, and may factor the dependency into its attribution of uplift to the first and subsequent impressions.

The multi-channel delivery service may utilize the uplift determinations made by the multi-channel attribution service to select a channel, recipient, and/or message for a potential impression. For example, the multi-channel delivery service may receive an opportunity to deliver an impression to Alice via a streaming audio channel. The multi-channel delivery service may have potential messages #1, #2, and #3 that are candidates for delivery to this recipient via this channel, and some or all of these messages may be associated with impression paths: Alice may have already received three impressions of message #1 via various channels, one impression of message #2 via placement on a web page, and no impressions of message #3. The multi-channel delivery service may therefore utilize the multi-channel attribution service to determine an uplift for adding the impression "message #1 to Alice via streaming audio" to the existing path with three impressions of message #1, an uplift for adding "message #2 to Alice via streaming audio" to the impression path that contains a single impression of message #2 via a web page, and an uplift for adding "message #3 to Alice via streaming audio" to an empty impression path. The multi-channel delivery service may thus determine that an impression of message #1 would result in an uplift of 0.2, an impression of message #2 would have an uplift of 0.1, and an impression of message #3 would have an uplift of 0.0, and accordingly may cause delivery of message #1 to Alice via the streaming audio channel.

In some embodiments, as described above, the multi-channel message delivery service may select a message to deliver to a particular recipient and channel by constructing impression paths that include an additional potential impression. In other embodiments, the multi-channel message delivery service may use previously determined uplifts to select a message to deliver, without regard to the impression paths for a particular recipient. For example, the multi-channel attribution service may aggregate uplifts for a message and a channel across several recipients to determine that delivering message #1 via streaming audio has an average uplift of 0.2, delivering message #2 via streaming audio has an average uplift of 0.0, and delivering message #3 via streaming audio has an average uplift of 0.3. The multi-channel message delivery service may thus select message #3 for delivery via the streaming audio channel. In further embodiments, the multi-channel message delivery service may use combinations of these approaches. For example, the multi-channel message service may rule out message #2 based on its average uplift of 0.0 when delivered via streaming audio, and may then construct lengthened impression paths and determine recipient-specific uplifts for messages #1 and #3 in order to determine which message to deliver.

In another embodiment, the multi-channel message delivery service may receive a request to deliver a message to channels and recipients that it determines. Illustratively, the multi-channel message delivery service may receive a message and/or a message profile that allows the service to determine characteristics of the message. Message characteristics may include, for example, a topic, product, service, or activity associated with the message, an indicator of message complexity, demographics of the intended recipients, criteria for selecting recipients or channels, and other details. The multi-channel message delivery service may use the message profile to identify similar messages. For example, the multi-channel message delivery service may receive a request to deliver an advertisement for a product. The service may identify an advertisement for a related product as a similar message.

The multi-channel message delivery service may further obtain recipient profiles for potential recipients of the message. The recipient profiles may include information such as recipient characteristics, similarities between recipients, and indications of whether the recipient will be receptive to various messages and channels. For example, a recipient profile may indicate that Bob purchased a hair care product after receiving an impression of a related message via social media, or may indicate that Charlie and Dan both ignored messages urging them to update their user profiles when the messages were delivered via email.

Still further, the multi-channel message delivery service may obtain channel profiles for potential channels that could be used to deliver the message. A channel profile may include characteristics of the channel, such as a channel type, whether the channel is one-way or interactive, and characteristics of recipients who receive messages the channel. For example, the channel profile for a particular social network may indicate that recipients of messages delivered via the social network are particularly interested in making business connections, or the channel for a particular podcast may indicate that recipients are likely to be interested in photography. Channel profiles may further indicate the channel's effectiveness at delivering messages with various characteristics.

The multi-channel message delivery service may then obtain incremental probabilities for potential impressions of the message with various potential channels and recipients. For example, the multi-channel message delivery service may obtain a message profile, channel profiles for channels A, B, C, and D, and recipient profiles for recipients Alice, Bob, and Charlie. The multi-channel message delivery service may then iteratively determine an incremental probability for each combination of message, channel, and recipient, yielding a table of incremental probabilities such as:

|  | Channel A | Channel B | Channel C | Channel D |
|---|---|---|---|---|
| Alice | 0.2 | 0.1 | 0.4 | 0.2 |
| Bob | 0.1 | 0.2 | 0.2 | 0.1 |
| Charlie | 0.3 | 0.0 | 0.5 | 0.2 |

The multi-channel message delivery service may thus determine that delivering the message to Charlie via Channel C yields the greatest incremental probability of conversion, and deliver the message accordingly. In some embodiments, the multi-channel message delivery service may determine and cause delivery of multiple impressions of the message. For example, the multi-channel message delivery service may cause delivery of the message whenever the uplift for an impression exceeds a threshold, or may cause a specified number or percentage of potential impressions to be delivered. In some embodiments, the multi-channel message delivery service may obtain a cost associated with delivering an impression via each delivery channel, and may perform a cost-benefit analysis to select impressions or may deliver impressions until a messaging budget is consumed.

In some embodiments, the multi-channel message delivery service may select its potential recipients independently of its selection of potential channels, or may select potential channels and/or recipients based on, for example, characteristics of the message. For example, the multi-channel message delivery service may determine, based on recipient profiles, that Alice and Charlie are more likely to be receptive to a message regarding a consumer electronics product, and may narrow the pool of potential recipients accordingly. As a further example, the multi-channel message delivery service may determine that Channel B has a low average uplift for messages of this type, and remove it from the consideration set. Various other combinations and criteria are within the scope of the present disclosure.

FIG. 1A depicts a schematic block diagram of an illustrative network topology 100 for implementing aspects of the present disclosure. The illustrated network topology 100 includes recipient computing devices 110, message providers 112, message delivery channels 114, a multi-channel attribution service 140, and a multi-channel message delivery service 160 communicating via a network 120.

Recipient computing devices 110 may generally include any computing devices that receive messages and that interact with message delivery channels 114, the multi-channel attribution service 140, and the multi-channel message delivery service 160 in the manner described herein or in a similar manner. Examples of recipient computing devices 110 include, but are not limited to, smartphones, tablet computers, laptops, personal computers, wearable computing devices, personal digital assistants (PDAs), hybrid PDA/mobile phones, electronic book readers, digital media players, integrated components for inclusion in computing devices, appliances, electronic devices for inclusion in vehicles or machinery, gaming devices, set top boxes, electronic devices for inclusion in televisions, and the like.

Message providers 112 may generally include any source of messages that are delivered via a multi-channel message delivery service 160. Message providers 112 may include, for example, web servers, database servers, networked computing service providers, hosted computing environment providers, e-commerce platforms, authentication servers, and other computing devices operated by senders of electronic communications. Message delivery channels 114 may generally include any channel via which messages can be delivered to recipient computing devices 110. Message delivery channels 114 may include, for example, streaming audio channels, streaming video channels, web servers, search engines, social networks, instant messaging platforms, software applications, email servers, and computing devices that enable delivery of messages via offline media such as television, radio, newspapers, and the like.

The illustrated network topology 100 further includes a multi-channel attribution service 140. In the illustrated embodiments, the multi-channel attribution service 140 includes a recipient profile module 142, a message profile module 144, and a channel profile module 146. These modules may generate, store, and retrieve their respective profiles in a profile data store 148.

The multi-channel attribution service 140 may further include a message impression module 150, which may generate, store, and retrieve information related to message impressions. As described above, an impression may be generally described as an instance of presenting a particular message to a particular recipient via a particular channel. The message impression module 150 may obtain information regarding an impression, such as the date and time, a duration, a degree of interaction that the recipient had with the impression, and/or other characteristics. In various embodiments, the message impression module may receive information regarding an impression from recipient computing devices 110, message providers 112, message delivery channels 114, and/or other computing devices that are in communication with the multi-channel attribution service 140 (not shown in FIG. 1A). The message impression module 150 may retrieve profiles and other information regarding the message, recipient, and channel that participated in the impression. The message impression module 150 may store some or all of this information, along with information relating to the impression itself, in an impression path data store 152.

As described above, an impression path may comprise a collection of impressions involving a particular recipient and message, or in some embodiments may be extended to include impressions involving similar recipients and/or similar messages. The message impression module 150 may generate or update impression paths dynamically, as it receives information regarding the impressions, or it may generate an impression path when a conversion event occurs. The message impression module 150 may generate impression paths subject to various constraints on the age of impressions, number of impressions, or other criteria that limit the size or scope of an impression path. The message impression module 150 may store impression paths, individual impressions, or a combination of both in the impression path data store 152.

The multi-channel attribution service 140 may further include a conversion event attribution module 154. The conversion event attribution module 154 may illustratively receive information regarding conversion events from entities such as recipient computing devices 110, message providers 112, or other computing devices. As described below in more detail, the conversion event attribution module 154 may identify a message and an impression path associated with the conversion event, determine an uplift or other incremental probability of conversion for particular message impressions, and store these probabilities in a probability data store 156.

Figure 1B:
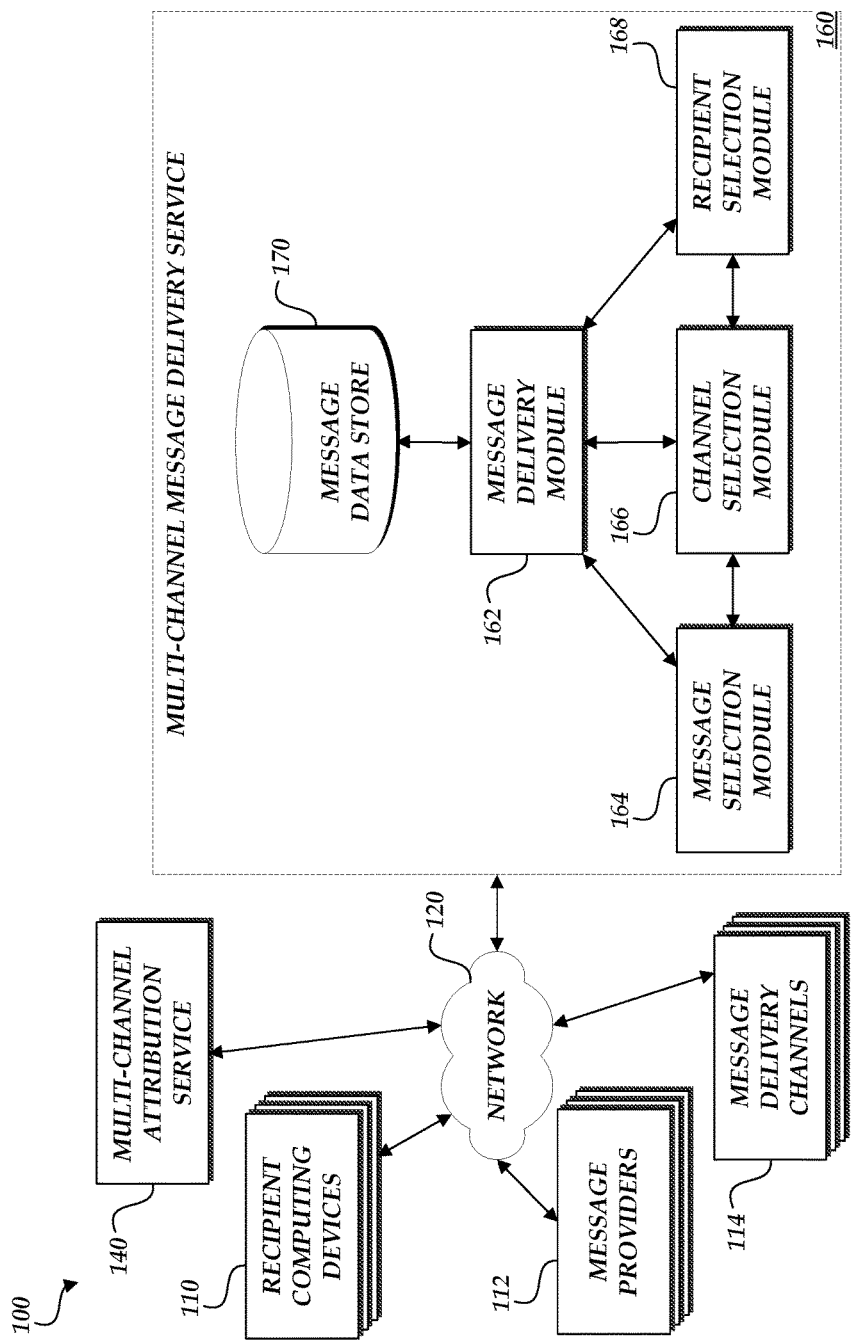

Turning now to FIG. 1B, the illustrated network topology 100 further includes a multi-channel message delivery service 160. The multi-channel message delivery service 160 may include a message delivery module 162, which receives and processes requests to deliver messages to recipients via channels. The message delivery module 162 may illustratively receive requests from message providers 112, from message delivery channels 114, from recipient computing devices 110, or from other computing devices not shown in FIG. 1B.

The multi-channel message delivery service 160 may further include a message selection module 164, channel selection module 166, and recipient selection module 168. In various embodiments, these modules may be combined or divided such that, for example, the channel and recipient for a message may be selected by a single module. The message delivery module 162 may additionally store and obtain information regarding messages to be delivered, such as audio, video, text, or other message content, in a message data store 170.

In various embodiments beyond those depicted in FIGS. 1A and 1B, components of the multi-channel attribution service 140 and the multi-channel message delivery service 160 may be combined or divided. As examples, the multi-channel attribution service 140 may be a component of the multi-channel message delivery service 160, the profile data store 148 may be a shared component or a separate component, or the probability data store 156 may be a component of the multi-channel message delivery service 160. The network topology 100 depicted in FIGS. 1A and 1B is thus understood to be illustrative and not limiting.

Figure 2:
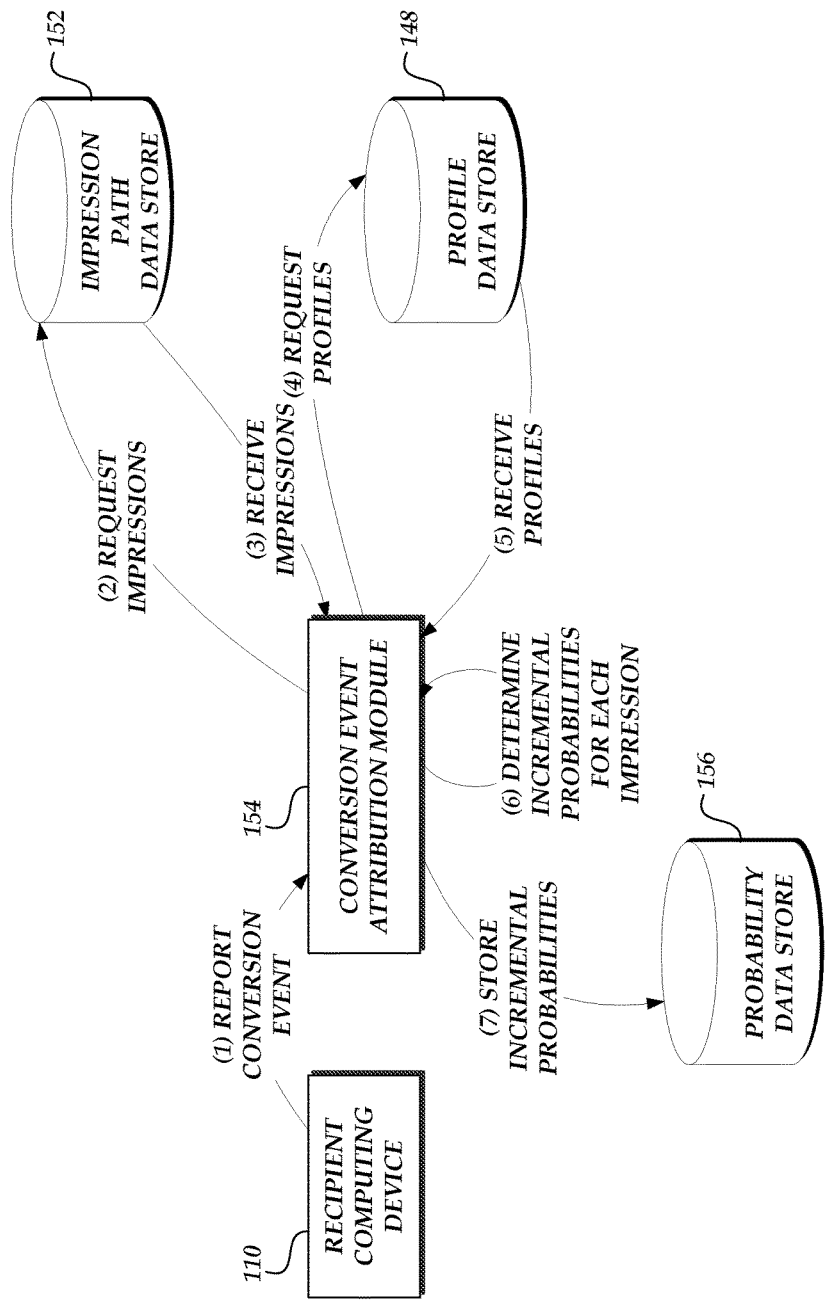
FIG. 2 is an illustrative block diagram depicting attribution of a conversion event that took place after communication via multiple channels, in accordance with aspects of the present disclosure.

With reference now to FIG. 2, a block diagram illustrating attribution of a conversion event will be described. At (1) a computing device, such as the recipient computing device 110 of FIG. 1A, reports a conversion event to the conversion event attribution module 154. As described above, a conversion event may be associated with a message recipient, and may involve the recipient performing an activity, utilizing a product or service, acquiring a product or service, responding to a message, or taking another action. In some embodiments, the recipient computing device 110 may also associate the conversion event with a message. For example, the event may be that the recipient sent a reply to an email message or selected an option to view a page or user interface referenced in a message. In other embodiments (not depicted in FIG. 2), the conversion event attribution module 154 may identify a message associated with the conversion event, or may determine whether particular messages are associated with the event.

At (2), the conversion event attribution module 154 requests from the impression path data store 152 information regarding impressions that include the recipient and the message associated with the conversion event. In some embodiments, the conversion event attribution module 154 may request an impression path that includes these impressions, which it may receive at (3). In other embodiments, as described above, the conversion event attribution module 154 may receive individual impressions at (3) and may generate an impression path.

At (4), the conversion event attribution module 154 requests from the profile data store 148 a recipient profile corresponding to the recipient, a message profile corresponding to the message, and channel profiles corresponding to the channels that were involved in the individual impressions on the impression path. In various embodiments, requests for some or all of the profiles may be omitted. At (5), the conversion event attribution module 154 receives the profile information it requested. One skilled in the art will appreciate that the interactions at (2) and (4) may occur in either order or simultaneously, and that the interactions at (3) and (5) may similarly occur in either order or simultaneously.

At (6), the conversion event attribution module 154 determines an incremental probability of conversion for each impression on the impression path. Illustratively, the conversion event attribution module 154 may determine incremental probabilities using a routine such as the illustrative conversion attribution routine 500, which is described in more detail below with reference to FIG. 5. At (7), in some embodiments, the conversion event attribution module 154 may store the incremental probabilities of conversion in the probability data store 156. In other embodiments, the conversion event attribution module may report incremental probabilities to, for example, the multi-channel message delivery module 160, message providers 112, message delivery channels 114, or other entities.

Figure 3:
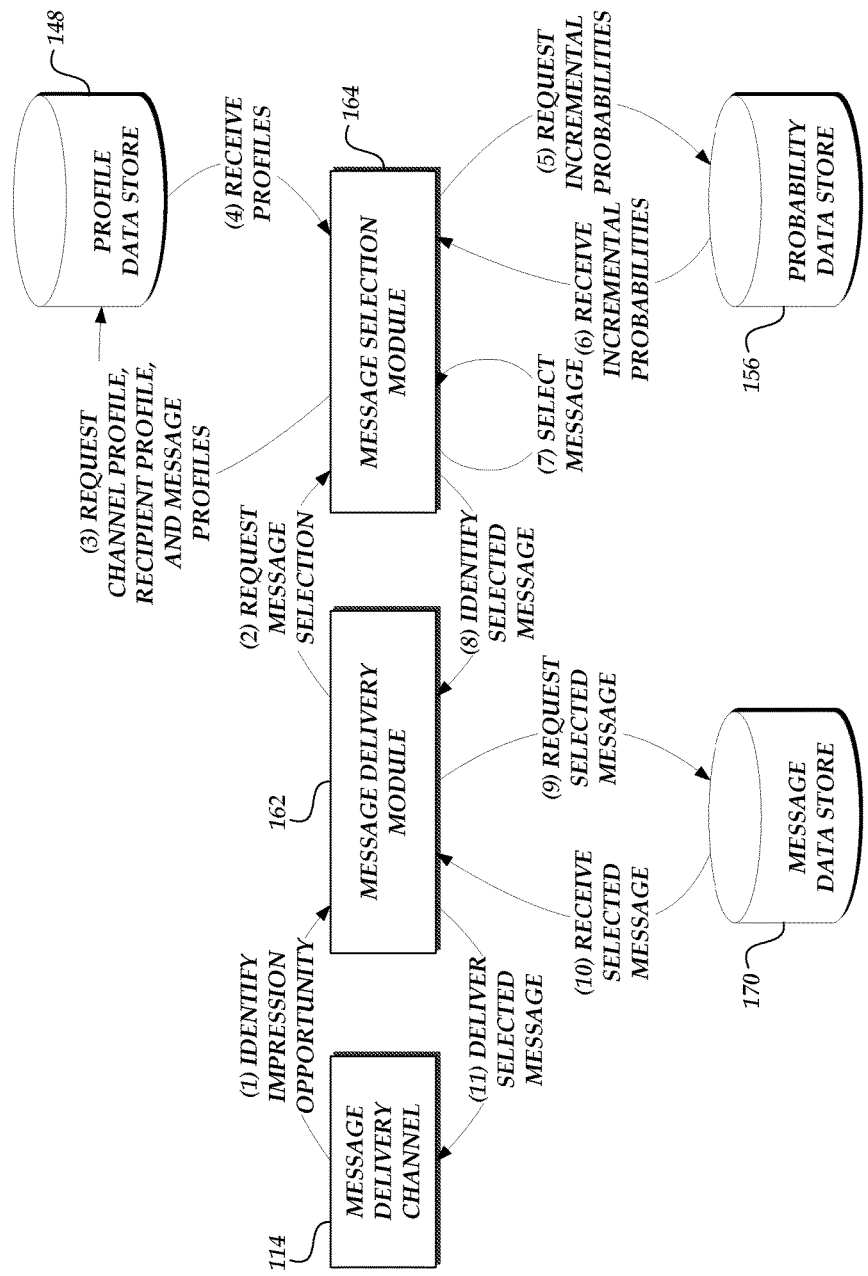
FIG. 3 is an illustrative block diagram depicting selection and delivery of a message for impression via a specified message delivery channel.

Turning now to FIG. 3, a block diagram illustrating selection and delivery of a message to a specified recipient and channel will be described. At (1), an impression opportunity is identified, and may illustratively be associated with a particular delivery channel and recipient. In some embodiments, the impression opportunity is identified by a message delivery channel 114. For example, a streaming audio channel may receive a request for streaming audio from a recipient, and may request that the message delivery module 114 provide a message to include with the streaming audio. In other embodiments, the message delivery module 162 may identify impression opportunities based on information provided by message delivery channels 114, or based on information obtained from message profiles or channel profiles.

At (2), the message delivery module 162 requests that the message selection module 164 select a message for delivery. The request may illustratively include the channel to be used for delivery and the expected recipient. At (3), the message selection module 164 requests profile information for the channel, the recipient, and potential messages, and at (4) the message selection module 164 receives these profiles. In some embodiments, the message selection module 164 receives these profiles from the profile data store 148 of the multi-channel attribution module 140.

At (5), the message selection module 162 requests incremental probabilities. Illustratively, incremental probabilities may be requested for impressions that each include the recipient, the channel, and one of the potential messages. As described above, in some embodiments, these incremental probabilities may have been previously determined by the multi-channel attribution module 140 and stored in the probability data store 156. In other embodiments, the message selection module 162 may request that the multi-channel attribution module 140 determine an incremental probability for each potential impression. At (6), the message selection module receives the incremental probabilities associated with delivering each of the potential messages to the recipient via the channel.

At (7), the message selection module 164 selects one of the potential messages. For example, the message selection module 164 may receive incremental probabilities indicating that delivering message #1 to Bob via channel X would have an uplift of 0.2, delivering message #2 to Bob via channel X would have an uplift of 0.3, and delivering message #3 to Bob via channel X would have an uplift of 0.0. The message selection module 164 may thus select message #2 for delivery.

At (8), the message selection module 164 identifies the selected message to the message delivery module 162, and at (9) the message delivery module requests the selected message from the message data store 170. In some embodiments, the message data store 170 stores the content of the message. In other embodiments, the message data store 170 stores information that enables the message delivery channel 114 to deliver the message. At (10), the message delivery module 162 receives the selected message (or the information), and at (11) the message delivery module sends the selected message or the information to the message delivery channel 114.

In various embodiments, the interactions depicted in FIG. 3 may be combined, separated, or modified within the scope of the present disclosure. For example, the impression opportunity at (1) may only identify the channel that will be used, and may not identify a particular recipient. As a further example, a message delivery channel 114 may provide information that can be used to select or identify a recipient, and the message delivery module 162 may request that the recipient selection module 168 (not depicted in FIG. 3) select or identify the recipient. As a still further example, the incremental probabilities requested at (5) and received at (6) may not be specific to the recipient, and may instead specify aggregate uplifts associated with delivery of each potential message via the specified delivery channel.

Figure 4A:
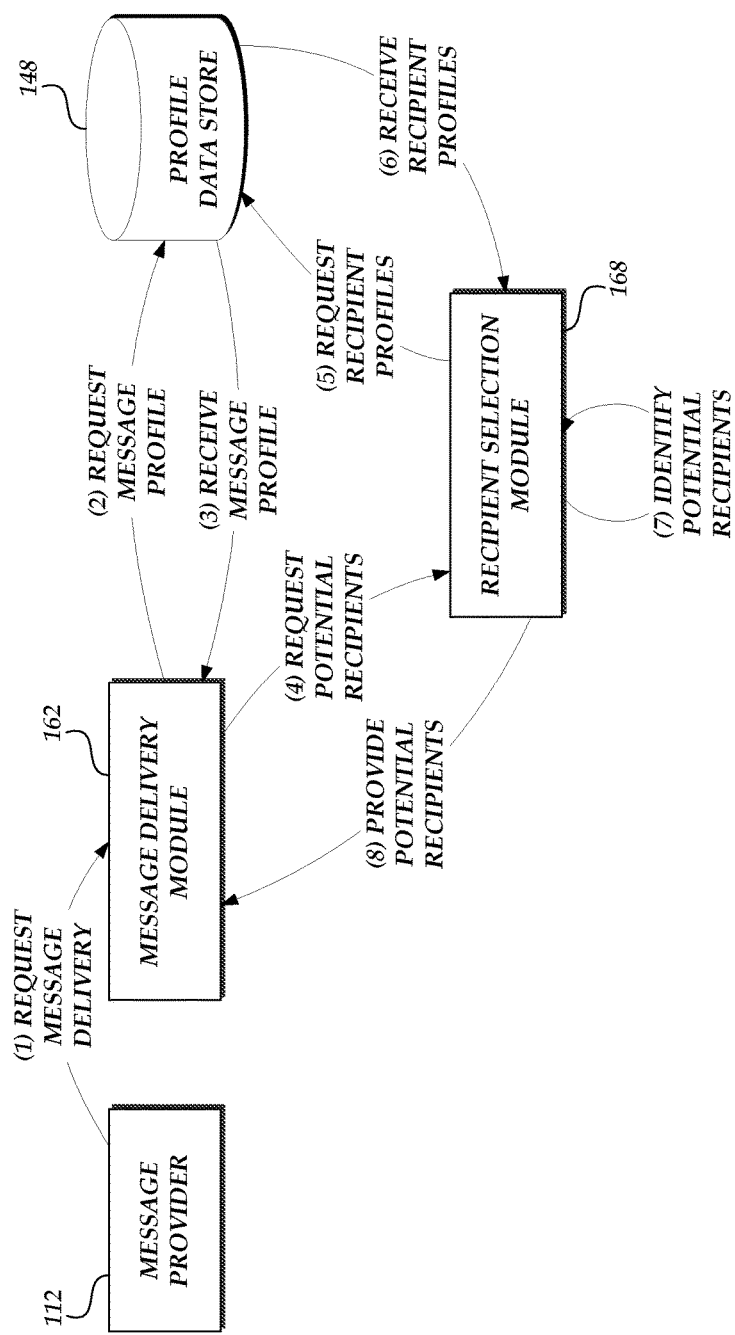
FIGS. 4A, 4B, and 4C are illustrative block diagrams depicting selection of recipients and delivery channels for impressions of a specified message.
Figure 4B:
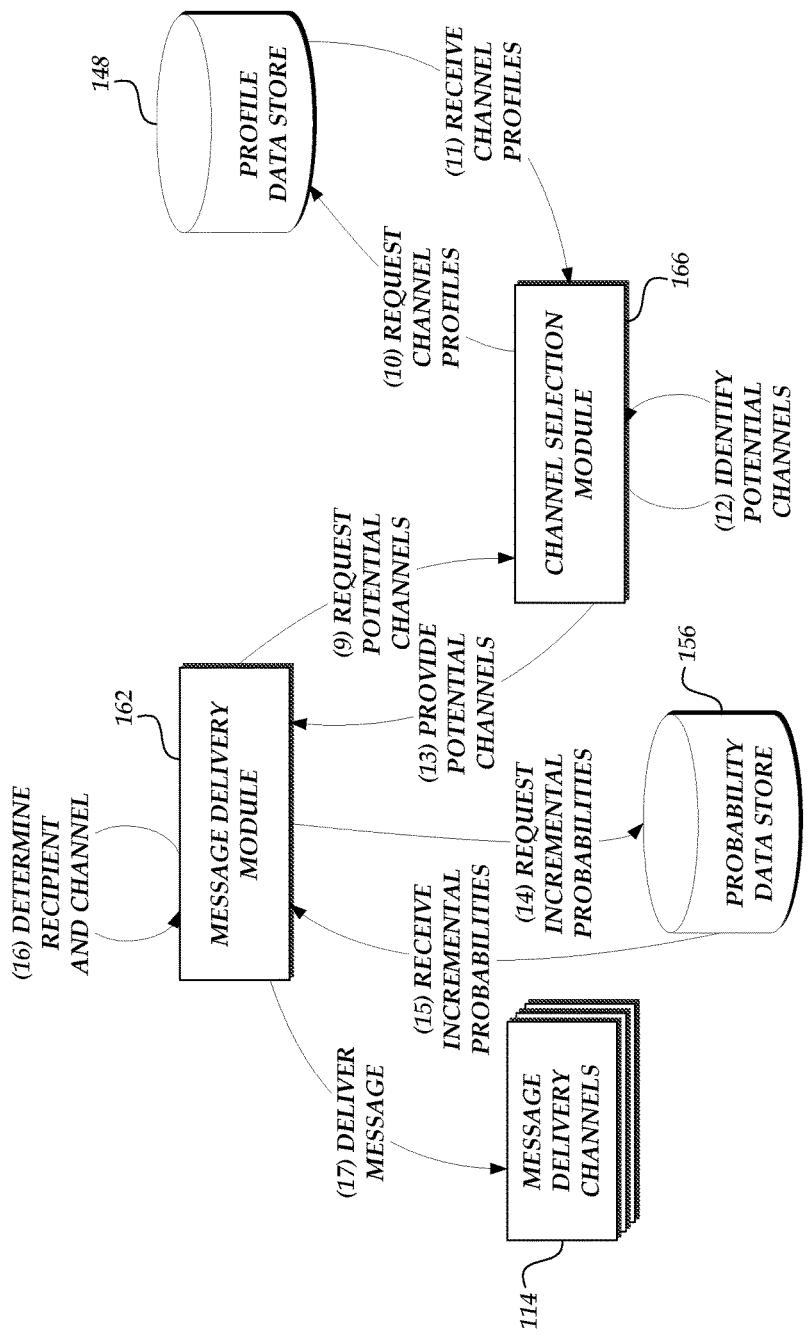
Figure 4C:
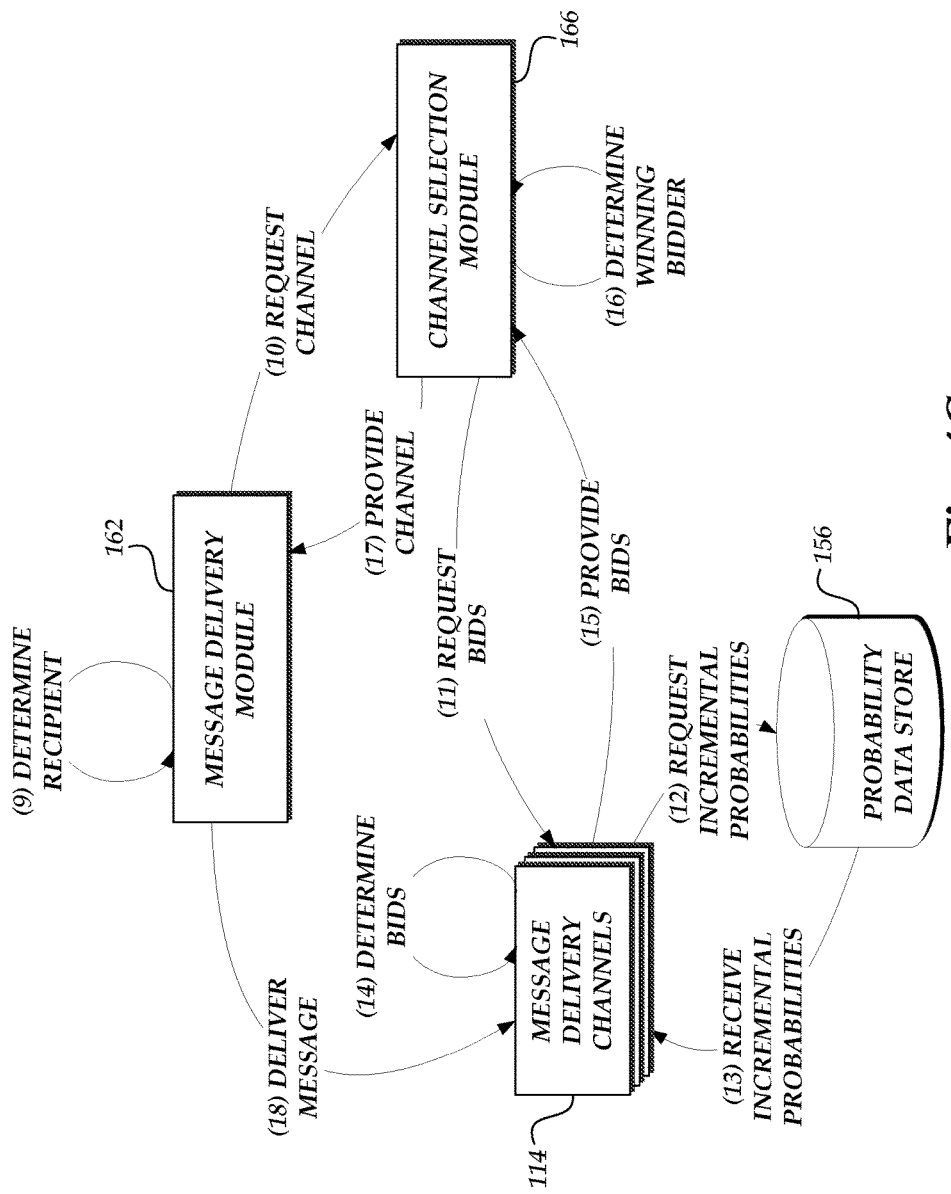

With reference now to FIGS. 4A, 4B, and 4C, block diagrams illustrating selection of channels and recipients for a specified message will be described. At (1), a message provider 112 requests delivery of a message to recipient/channel combinations with relatively high incremental probabilities of conversion. At (2), the message delivery module 162 requests a message profile corresponding to the message in the request, and at (3) the message delivery module 162 receives the message profile. In various embodiments, the request at (1) may include a message profile, in which case the interactions at (2) and (3) are omitted, or the message delivery module 162 may analyze the message, generate a message profile, and store the message profile in the profile data store 148.

At (4), the message delivery module 162 requests that the recipient selection module 168 identify potential recipients of the message. The recipient selection module 168, at (5), requests a set of recipient profiles from the profile data store 148. The recipient selection module 168 may request recipient profiles that meet various criteria. For example, in one embodiment, the recipient selection module 168 may request only profiles that characterize a recipient who receives messages via channel X. At (6), the recipient selection module 168 receives the profiles from the profile data store 148. In some embodiments, the recipient selection module 168 may communicate directly with the profile data store 148. In other embodiments, the recipient selection module 168 may communicate with the multi-channel attribution module 140 to request profiles from the profile data store 148.

At (7), the recipient selection module 168 applies additional criteria to the set of recipient profiles to identify potential recipients of the message. For example, recipient profiles may indicate that messages sent to Alice via channel X have an average uplift of 0.3, messages sent to Bob via channel X have an average uplift of 0.1, and messages sent to Charlie via channel X have an average uplift of 0.4. The recipient selection module may identify only those potential recipients whose average uplift for channel X messages exceeds a threshold, may identify a minimum number or percentage of potential recipients based on the recipient profiles, or may apply criteria based on a message profile or message content. At (8), the recipient selection module 168 provides the identified potential recipients to the message delivery module 162.

In some embodiments, the interactions at (4)-(8) may be omitted, and the message delivery module 162 may obtain a set of potential recipients directly from the profile data store 148. Additionally, in some embodiments, the message delivery module 162 may select a channel for message delivery without identifying particular recipients.

Turning now to FIG. 4B, at (9), the message delivery module 162 requests potential channels for delivering the message. The channel selection module 166 receives the request, and at (10) the channel selection module 166 requests a set of channel profiles from the profile data store 148. As above, the channel selection module 166 may communicate directly or indirectly with the profile data store 148, or may have its own data store that is not associated with the multi-channel attribution module 140. The channel selection module 166 may request channel profiles that meet various criteria, such as channels having a minimum average uplift and/or having the capability to deliver the requested message. For example, a message that conveys visual information may not be deliverable via a podcast or other streaming audio channel. At (11), the channel selection module 166 receives the set of channel profiles.

At (12), the channel selection module 166 uses the channel profiles to identify potential channels for delivering the message. As described above with regard to identifying potential recipients, the channel selection module 166 may identify potential channels based on characteristics of the message and the potential channel. For example, channel profiles may indicate that channel X has an average uplift of 0.4 when delivering advertisements for home appliances, channel Y has an average uplift of 0.3 when delivering such messages, and channel Z has an average uplift of 0.0 when delivering such messages. The channel selection module 166 may thus select channels X and Y as potential channels for the message. At (13), the channel selection module may provide the identified potential channels to the message delivery module.

In various embodiments, the interactions at (9)-(13) may be omitted, carried out before or in parallel to the interactions at (4)-(8), or combined with the interactions at (4)-(8). For example, the channel selection module 166 may identify channels that have a relatively high uplift when delivering messages to the potential recipients identified by the recipient selection module 168, or conversely the recipient selection module 168 may identify recipients who are relatively receptive to messages delivered via the potential channels selected by the channel selection module 166. As a further example, the message delivery module 162 may obtain a list of all channels that are available to deliver the message.

At (14), the message delivery module 162 requests incremental probabilities for impressions of the message with the identified potential recipients and potential channels. Illustratively, the message delivery module 162 may request previously determined incremental probabilities from the probability data store 156, and may receive them at (15). In some embodiments, as described above, the message delivery module 162 may request that the multi-channel attribution module 140 determine incremental probabilities by generating lengthened impression paths for various combinations of the message, a potential recipient, and a potential channel. The message delivery module 162 may further combine these approaches. For example, the message delivery module 162 may determine that some incremental probabilities have been previously determined and stored, and that other incremental probabilities will require determination. The message delivery module 162 may thus request that the missing incremental probabilities be calculated by the multi-channel attribution module 140, or in some embodiments may calculate and store them. In some embodiments, incremental probabilities may be determined based on, for example, the time of day of an impression, the day of the week of the impression, the inclusion or exclusion of other channels in an impression path, the sequence of impressions in the impression path, the frequency or timing of impressions in the impression path, and/or other factors.

At (16), the message delivery module 162 determines a recipient and a channel for delivering the message. The recipient and channel may be determined as described above, by comparing incremental probabilities for each combination of message, recipient, and channel. Alternatively, in some embodiments, the channel may be determined by comparing incremental probabilities for each combination of message and channel, and delivered to any recipient who is receiving messages via that channel. Similarly, the recipient may be determined based on recipient/channel incremental probabilities, and the message delivered via any channel that delivers messages to the selected recipient. Still further, in some embodiments, the recipient and the channel may be determined independently, using recipient/message uplifts to determine the recipient and channel/message uplifts to determine the channel. At (17), the message delivery module 162 delivers, or causes delivery of, the message to the selected recipient via the selected channel.

FIG. 4C depicts an alternative embodiment to the one illustrated in FIG. 4B. In the alternative embodiment, a message delivery channel is determined through a competitive bidding process. In the embodiment illustrated in FIG. 4C, the message delivery module 162 at (9) determines a recipient for the message, and at (10) requests that the channel selection module 166 select a delivery channel for the message and recipient. Thereafter, at (11), the channel selection module 166 requests that the message delivery channels 114 bid on the opportunity to deliver the message to the recipient. Illustratively, the channel selection module 166 may provide information to the message delivery channels 114 regarding characteristics of the message and/or the recipient. In some embodiments, the interaction at (9) may be omitted, and the message delivery channels 114 may bid on the opportunity to deliver the message to a recipient that they determine, or to an undetermined recipient.

At (12), the individual message delivery channels 114 request incremental probabilities of conversion for the combination of the individual channel, the message, and the recipient. As described above, the incremental probabilities may be previously determined, or in some embodiments may be determined (e.g., by generating impression paths and determining a delta) in response to the request. Illustratively, the message delivery channels 114 may request incremental probabilities from the probability data store 156, as depicted in FIG. 4C, or from, for example, the multi-channel attribution service of FIG. 1A. At (13), the message delivery channels 114 receive their respective incremental probabilities.

At (14), each of the message delivery channels 114 determines a bid. For example, a first message delivery channel may determine an incremental probability of conversion of 0.2 for delivering the message to the recipient via the first message delivery channel, and a second message delivery channel may determine an incremental probability of conversion of 0.1 for delivering the message to the recipient via the second delivery channel. The first message delivery channel may thus bid 0.2 for the opportunity to make the impression, and the second message delivery channel may bid 0.1.

In some embodiments, one of the message delivery channels 114 may determine a cost associated with message delivery, and may determine its bid as a delta or multiplier. For example, an expensive message delivery channel having a cost per message of $0.10 may obtain an incremental probability of 10%, and may determine a bid of $1. An inexpensive message delivery channel having a cost per message of $0.01 may obtain an incremental probability of 5%, and determine a bid of $5. The inexpensive message delivery channel may thus outbid the expensive delivery channel for the opportunity to deliver the message, even though the more expensive delivery channel has a higher incremental probability in absolute terms. In further embodiments, as described above, a message delivery channel may consider factors such as the time of day, day of week, use of other message delivery channels 114, or other factors. Additionally, in various embodiments, bids may be expressed as probabilities, percentages, amounts of currency, multipliers, or any other values.

At (15), the message delivery channels 114 provide their respective bids to the channel selection module 166, which at (16) determines the winning bidder. In various embodiments, the channel selection module 166 may determine the highest bid, the lowest bid, or may apply other criteria to select the winning bid. For example, the channel selection module 166 may determine that the highest bid not exceeding a budgeted amount is the winning bid. At (17), the channel selection module 166 identifies the winning bidder to the message delivery channel 162 as the delivery channel for the message, and at (18) the message delivery module delivers or causes delivery of the message to the selected recipient via the selected channel.

Figure 5:
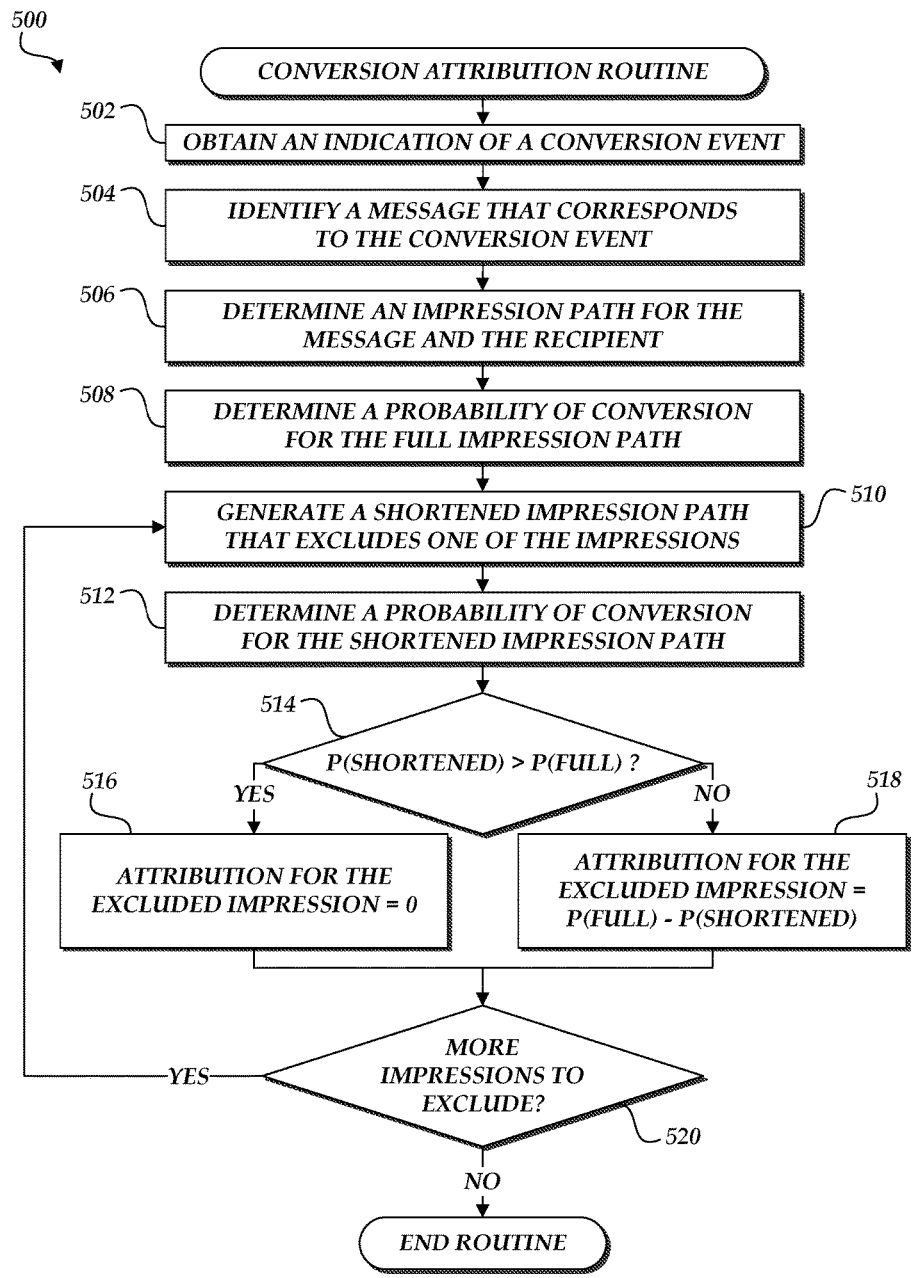
FIG. 5 is a flow diagram depicting an illustrative conversion attribution routine in accordance with aspects of the present disclosure.

With reference now to FIG. 5, an illustrative conversion attribution routine 500 for attributing shared responsibility for a conversion event to various impressions will be described. The illustrative routine 500 may be carried out, for example, by the conversion event attribution module 154 of FIG. 1A.

At block 502, an indication of a conversion event may be obtained. As described above, the indication of the conversion event may illustratively be performance of an activity, utilization of a product or service, acquisition of a product or service, a response to a message, or the like. For example, the conversion event may be that Alice evacuated from the path of an approaching hurricane, that Bob purchased a software application, or that Charlie initiated the return of a product that was subject to a safety recall.

At block 504, a message may be identified that corresponds to the conversion event. The message may be, for example, a weather bulletin, product advertisement, recall notice, or other message that relates to the conversion event. In some embodiments, the conversion event may be associated with information identifying the corresponding message. For example, the conversion event may be responding to an email, or the indication of the conversion event may include a discount code or other identifier that ties the event to a particular message. In other embodiments, a message or a message profile may specify a conversion event to associate with the message, and the message may thus be identified based on the associated conversion event. In some embodiments, a relationship between a message and a conversion event may be inferred by identifying that the subject of a message (such as a product that is advertised in an advertisement) previously delivered to a given user relates to or matches the subject of the event (such as a purchase of the product).

At block 506, an impression path may be determined for the message and the recipient. Illustratively, the impression path may include a set of impressions, each of which corresponds to a particular delivery of the message to the recipient via a delivery channel. The impressions may illustratively include additional information, such as a date and time of the impression, a duration of the impression, and/or whether the recipient interacted with the message. For example, a set of impressions may be obtained that include:

| Impression # | Date | Message | Recipient | Channel |
| --- | --- | --- | --- | --- |
| 1 | Tuesday 4:14 p.m. | weather bulletin | Alice | email |
| 2 | Thursday 8:22 a.m. | weather bulletin | multiple | radio |
| 3 | Friday 7:45 p.m. | weather bulletin | Alice | streaming audio |
| 4 | Saturday 1:39 p.m. | product recall | Charlie | paper mail |

An impression path may thus be generated for Alice and the weather bulletin that includes impressions #1, #2, and #3. For impressions delivered via certain channels, such as impression #2, the exact recipient or recipients may not be identified. An impression path may thus be determined for a particular recipient that includes or excludes the impression based on probabilities, estimates, or information provided with the conversion event. For example, Impression #2 may be included in the impression path based on a viewership of the radio program that conveyed the message, or based on an indication in the conversion event (e.g., Alice used a particular evacuation route that was described in the message). In some embodiments, a weighting factor may be applied to the impression and included in the impression path according to an estimated probability of message delivery to the recipient.

At block 508, a probability of conversion may be determined for the impression path. In some embodiments, the probability of conversion may be determined as described above using equation (1) with parameters derived using maximum likelihood estimation. Illustratively, the probability of conversion may indicate that a person receiving the impression path above, containing impressions #1, #2, and #3 of the weather bulletin message, has a 70% probability of heeding the message and evacuating.

At block 510, a shortened impression path may be generated that excludes one of the impressions. For example, a shortened impression path may be generated that excludes impression #1 (the email), and includes only impressions #2 and #3 (the radio broadcast and the streaming audio message).

At block 512, a probability of conversion may be determined for the shortened impression path. As above, the probability of conversion for the shortened impression path may be determined in some embodiments using equation (1). Continuing the example above, the probability of conversion for the shortened impression path may be determined such that people who received only the radio broadcast and the streaming audio message have a 60% probability of evacuating.

At decision block 514, a determination may be made by comparing the probability of conversion for the shortened impression path to the probability of conversion for the full conversion path. In the illustrative routine 500, if the probability of conversion for the shortened impression path exceeds the probability of conversion for the full impression path (indicating that receipt of the email in impression #1 made people less likely to evacuate), then at block 516 an attribution of zero may be determined for impression #1. In some embodiments, decision block 514 and block 516 may be omitted, and a potentially negative attribution may instead be determined at block 518.

At block 518, a delta between the probabilities of conversion for the full impression path and the shortened impression path may be attributed to the impression that was excluded from the shortened impression path. Continuing the example above, if the probability of conversion for the full conversion path is 70%, and the probability of conversion for the shortened conversion path is 60%, then an incremental probability of conversion of 10% may be attributed to impression #1.

At decision block 520, a determination may be made as to whether other shortened impression paths may be generated from the full impression path. If further shortened impression paths are available, then the routine 500 branches to block 510 and generates another shortened impression path. For example, block 510 may generate a second shortened impression path that includes impressions #1 and #3 and excludes the radio broadcast, and then iterate through blocks 512-520 before generating a third shortened impression path that includes impressions #1 and #2 and excludes the streaming audio impression. Blocks 512-520 may in turn attribute an incremental probability of 20% to the radio broadcast, and a 40% incremental probability to the streaming audio impression.

In some embodiments, the incremental probabilities of conversion for each impression may add up to a different total than the probability of conversion of the full impression path. For example, if negative probabilities of conversion are discarded, then the incremental probabilities of conversion for the impression path may exceed the total probability of conversion for the set of impressions. As a further example, as described above, the routine 500 may terminate after generating a specified number of shortened impression paths, such as the ten paths that each exclude one of the ten most recent impressions. In further embodiments, incremental probabilities of conversion may be estimated for individual impressions without the use of shortened conversion paths. For example, an incremental probability of conversion may be estimated using previous impressions of the same message or a similar message with the same or similar recipients.

Figure 6:
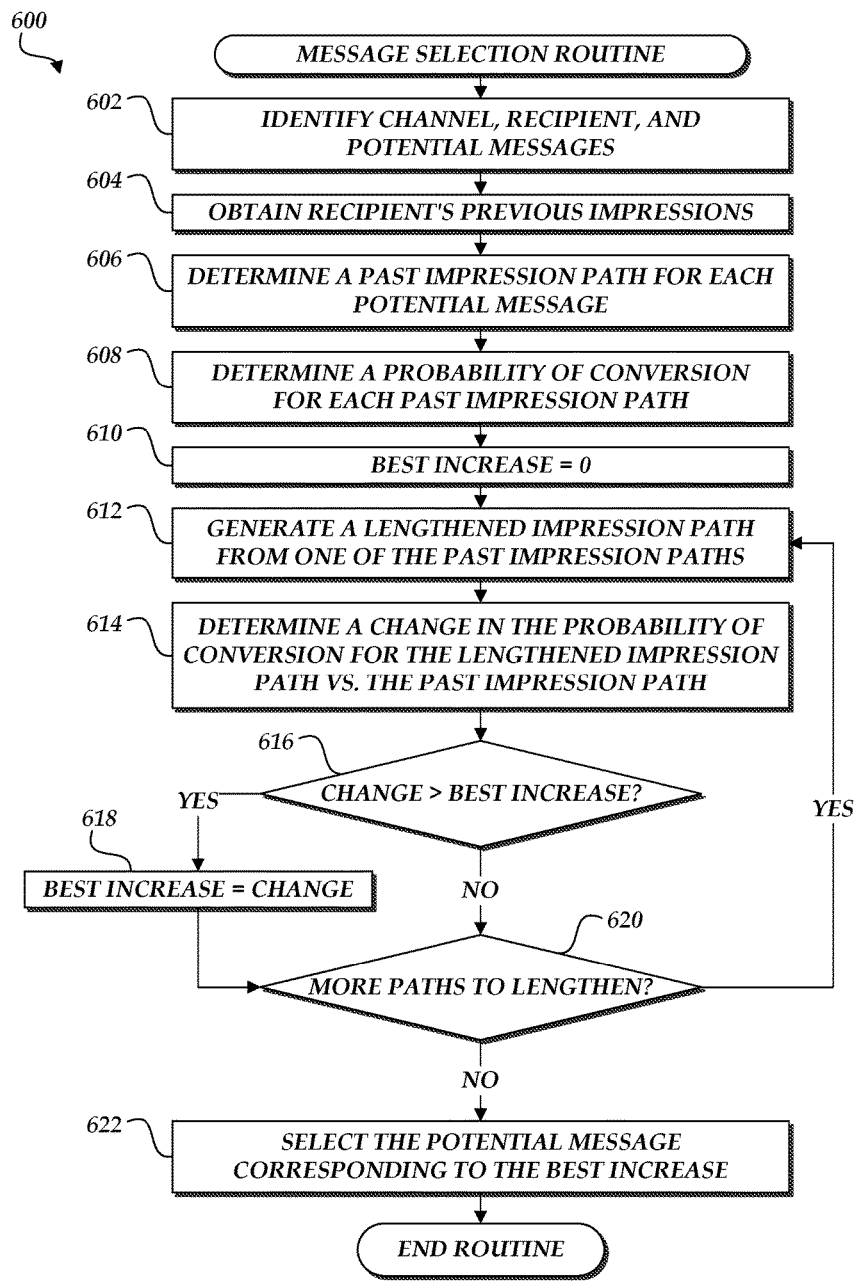
FIG. 6 is a flow diagram depicting an illustrative message selection routine in accordance with aspects of the present disclosure.

With reference now to FIG. 6, an illustrative message selection routine 600 for selecting a message to deliver will be described. The illustrative routine 600 may be carried out, for example, by the message selection module 164 of FIG. 1B.

At block 602, a channel, a recipient, and potential messages may be identified. Illustratively, the channel and recipient may be specified as part of a request to select a suitable message to deliver. For example, a streaming audio channel may identify an opportunity to deliver a message to Bob, and may request that the message selection module 164 select a message that has a relatively high incremental probability of conversion when delivered to Bob (or other recipients like Bob) via the streaming audio channel (or via other channels that share characteristics with the streaming audio channel). The potential messages may include all messages that are available for delivery, or may be filtered according to, for example, an average probability of conversion when delivered via the identified channel.

At block 604, previous impressions associated with the identified recipient may be obtained. In some embodiments, previous impression paths may be obtained. One skilled in the art will understand that previous impression paths may include impression paths that are associated with a conversion event, impression paths that are "ongoing" and have not yet led to a conversion event, and combinations of both. In further embodiments, as described above, previous impressions that are not associated with a particular recipient may also be included in the obtained previous impressions.

At block 606, a past impression path may be determined for each of the potential messages. Past impression paths may be determined as described above with reference to FIG. 5. At block 608, a probability of conversion may be determined for each past impression path, and at block 610, a variable may be initialized to store the highest increase in the probability of conversion caused by adding an impression to an existing impression path. In various embodiments, block 610 may be carried out at any time prior to block 612.

At block 612, a lengthened impression path may be generated by adding a potential impression to one of the past impression paths. The potential impression may correspond to delivery of a potential message to the identified recipient via the identified channel. For example, a past impression path may indicate that Bob has received three impressions of a message advertising a software application, which is one of the identified potential messages. The lengthened impression path thus includes the first three impressions plus a fourth potential impression, which would be a delivery of the potential message to Bob via the streaming audio channel.

At block 614, a probability of conversion may be determined for the lengthened impression path, and that probability of conversion may be compared to the probability of conversion that was determined at block 608 for the unaltered past impression path to determine a delta or change in the probability of conversion. For example, the probability of conversion for Bob after receiving three impressions of the software advertisement may be 20%, and the probability of conversion for Bob after four impressions of the advertisement would be 25%. The change in probability attributable to the fourth potential impression may thus be determined to be 5%.

At decision block 616, a determination may be made that the change in probability attributable to the additional impression is greater than any previously determined change. If so, then at block 618 the change in probability may be identified as the greatest increase determined thus far. At decision block 620, a determination may be made as to whether additional impression paths are available to be lengthened (i.e., whether there are other potential messages to consider), and if so the routine 600 branches to block 612 and generates another lengthened impression path. One skilled in the art will appreciate that each lengthened impression path may be generated from a different base impression path. For example, another potential message for delivery to Bob may be an advertisement for a television program. The past impression path for the advertising message, as determined at block 608, may include two impressions in which Bob received the message. The lengthened impression path that may be generated at block 612 may thus include these two impressions plus a third potential impression, and the change in the probability of conversion may be determined by comparing these impression paths. As a further example, a potential message may be identified that has no previous impressions, and thus at block 612 a probability of conversion for an impression path with one potential impression may be compared to a probability of conversion for an impression path with no impressions.

If all potential messages have been evaluated, then the routine 600 branches to block 622, where the potential message that corresponds to the greatest increase in a probability of conversion may be selected.

Figure 7:
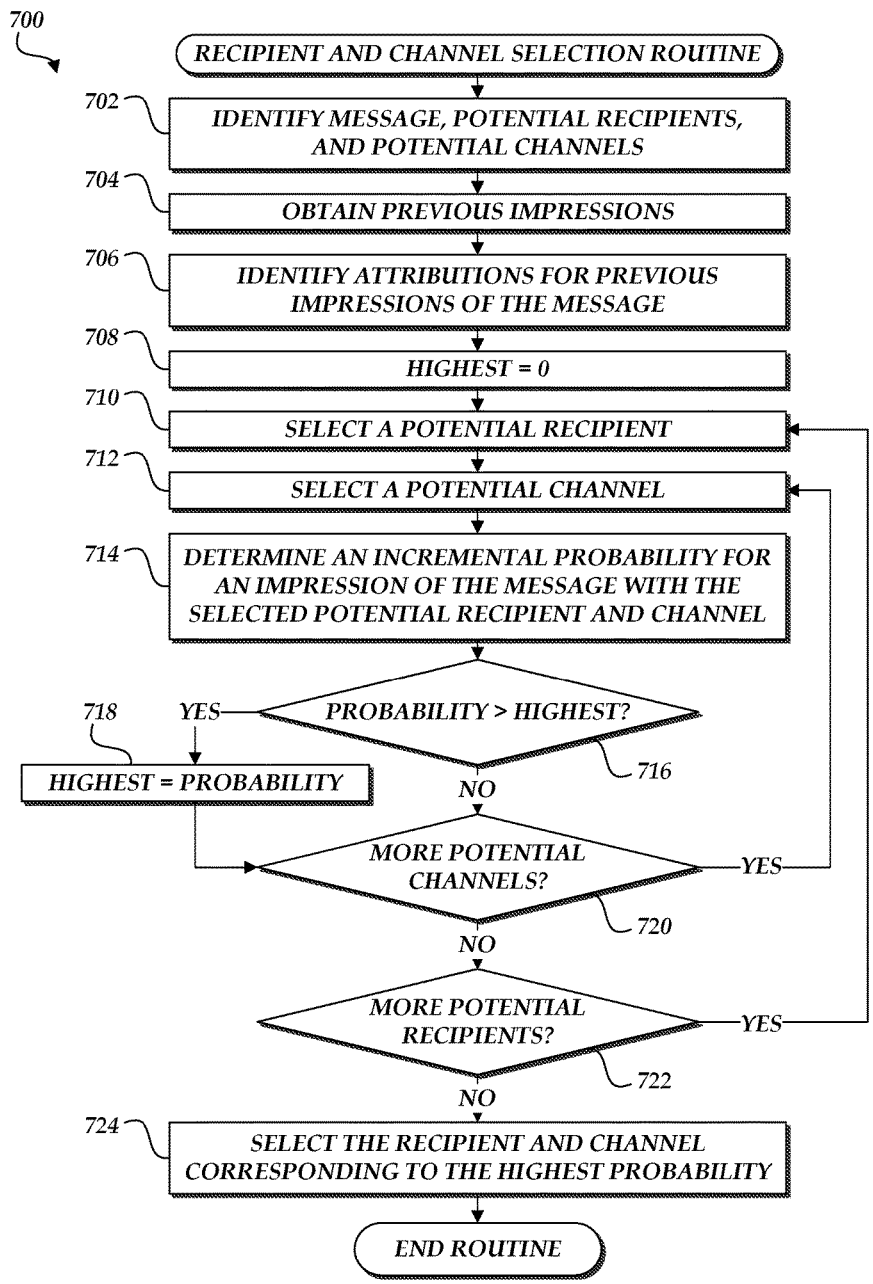
FIG. 7 is a flow diagram depicting an illustrative recipient and channel selection routine in accordance with aspects of the present disclosure.

With reference now to FIG. 7, an illustrative recipient and channel selection routine 700 for delivering impressions of a given message will be described. The illustrative routine 600 may be carried out, for example, by the message delivery module 162 of FIG. 1B.

At block 702, the message, potential recipients, and potential channels may be identified. Illustratively, potential recipients and channels may be identified as described above with reference to FIGS. 4A and 4B. For example, according to one embodiment, a message may be a license renewal notice, potential recipients may include Alice, Bob, and Charlie, and potential channels may include email, paper mail, and instant messaging.

At block 704, previous impressions of the message may be obtained. Illustratively, previous impressions may include that Alice previously received one impression of the license renewal notice via email, Bob previously received one impression of a similar notice via paper mail, and Charlie has received three impressions of the notice, all via email.

At block 706, attributions may be identified for the previous message impressions. Illustratively, the attributions may be obtained from a data store, such as the probability data store 156 of FIG. 1A. For example, attributions may be obtained that indicate a 60% probability of conversion for Alice's impression, a 70% probability of conversion for Bob's impression, and 40%, 10%, and 0% probabilities of conversion for Charlie's impressions. One skilled in the art will note that the probability of conversion may vary for impressions of the same message to the same recipient via the same channel. In some embodiments, as described above, probabilities of conversion may be generated rather than obtained.

At block 708, a variable may be initialized to store the highest probability of conversion. One skilled in the art will understand that block 708 may be carried at out any time prior to block 710. At block 710, a potential recipient may be selected, and a block 712 a potential channel may be selected.

At block 714, an incremental probability may be determined for an impression of the message with the selected potential recipient and potential channel. For example, the potential recipient may be Alice, and the potential channel may be email. A lengthened impression path may thus be generated that includes delivery of the renewal notice to Alice via email, and a probability of conversion for the lengthened impression path may be compared to a probability of conversion for the unaltered impression path, as previously discussed, to determine an incremental probability of conversion. Continuing the example, the incremental probability of conversion for Alice receiving a second copy of the notice via email may be determined to be 15%.

At decision block 716, a determination may be made as to whether the determined probability of conversion is the highest probability determined by the routine 700 thus far. If so, then at block 718 the new highest probability may be stored in the variable. The routine then continues at decision block 720, where a further potential channel may be identified that has not yet been evaluated with this potential recipient. If a further potential channel is identified, then the routine 700 branches to block 712 and evaluates an impression of the message to the potential recipient via the further potential channel. If all potential channels have been evaluated for this potential recipient, then at decision block 722 a further potential recipient may be identified, and if so then the routine 700 branches to block 710 and continues evaluating potential impressions.

If no further potential recipients are identified, then at block 724 a recipient and channel may be selected. Illustratively, the routine 700 may determine incremental probabilities of conversion as follows:

|  | Alice | Bob | Charlie |
| --- | --- | --- | --- |
| email | 15% | 30% | 0% |
| paper mail | 25% | 10% | 40% |
| instant messaging | 5% | 20% | 0% |

In the above table, the incremental probability of conversion for the impression "sending the notice to Alice via email" is 15%, the incremental probability of conversion for the impression "sending the notice to Bob via email" is 30%, and so forth. The recipient and channel may be selected to correspond to the impression having the highest probability of conversion. In the above example, sending the notice to Charlie via paper mail has the highest probability of conversion, and thus Charlie may be selected as the recipient and paper mail may be selected as the delivery channel. In some embodiments, a channel may be selected for each potential recipient rather than selecting a single recipient and channel. For example, paper mail may be selected as the most effective channel for delivering a next impression of the notice to Alice and Charlie, and email may be selected as the most effective channel for delivering a next impression of the notice to Bob. In other embodiments, a recipient may be selected for each potential channel.

In some embodiments, a per-impression cost may be associated with each channel, and the per-impression cost may be factored into channel selections. For example, the cost of sending an email may be $0.01 per message, the cost of sending paper mail may be $1 per message, and the cost of sending an instant message may be $0.10 per message. The incremental probability of conversion for sending a message may thus be weighed against the cost of sending a message, and the routine 700 may determine that delivering a message to Alice via email is more cost-effective than delivering a message to Alice via paper mail, despite the difference in incremental probability. In further embodiments, a budget may be associated with the message, and the routine 700 may select recipients and channels iteratively, taking the costs and benefits of each impression into account, until the budget is exhausted. In still further embodiments, message throttling or budgeting may be associated with a recipient. For example, a determination may be made in routine 700 that a third delivery of the same message to Alice within a specified time period will not increase the probability of conversion. Further variations and embodiments are within the scope of the present disclosure.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g." and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," "involving" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method comprising:
    as implemented by a computing device configured with specific executable instructions,
        receiving a message request, wherein the message request identifies a first recipient and a first delivery channel;
        obtaining, from a profile data store, a channel profile corresponding to the first delivery channel;
        obtaining, from the profile data store, a recipient profile corresponding to the first recipient;
        obtaining, from a message data store, a first potential message and a second potential message;
        determining, based at least in part on the channel profile, the recipient profile, and a first message profile corresponding to the first potential message, a first incremental probability of conversion associated with delivering the first potential message to the first recipient via the first delivery channel;
        determining, based at least in part on the channel profile, the recipient profile, and a second message profile corresponding to the second potential message, a second incremental probability of conversion associated with delivering the second potential message to the first recipient via the first delivery channel;
        selecting, based at least in part on the first incremental probability of conversion and the second incremental probability of conversion, a selected message from among the first potential message and the second potential message; and
        transmitting, to the first delivery channel, information that enables the first delivery channel to deliver the selected message to the first recipient.

2. The computer-implemented method of claim 1 further comprising:
obtaining, from the profile data store, the first message profile and the second message profile.

3. The computer-implemented method of claim 1, wherein selecting the selected message comprises:
determining that the first incremental probability of conversion is greater than the second incremental probability of conversion; and
selecting the first potential message as the selected message.

4. The computer-implemented method of claim 1, wherein determining the first incremental probability of conversion comprises:
obtaining an impression path, the impression path including at least a previous impression, wherein the previous impression corresponds to a previous delivery of the first potential message to the first recipient via a previous delivery channel;
determining a first probability of conversion based at least in part on the impression path;
generating a first potential impression corresponding to delivery of the first potential message to the first recipient via the first delivery channel;
combining the impression path with the first potential impression to form an extended impression path;
determining a second probability of conversion based at least in part on the extended impression path; and
comparing the first probability of conversion to the second probability of conversion to determine the first incremental probability of conversion.

5. A system comprising:
a profile data store configured to store message profiles, recipient profiles, and channel profiles;
a hardware processor in communication with the profile data store, the hardware processor configured to execute specific computer-executable instructions to at least:
receive, from a first computing device, a message delivery request, wherein the message delivery request identifies a first message and a first recipient;
obtain, from the profile data store, (a) a first message profile corresponding to the first message, (b) a first recipient profile corresponding to the first recipient, (c) a first channel profile corresponding to a first delivery channel, and (d) a second channel profile corresponding to a second delivery channel;
determine, based at least in part on the first message profile, the first recipient profile, and the first channel profile, a first incremental probability of conversion associated with delivering the first message via the first delivery channel;
determine, based at least in part on the first message profile, the first recipient profile, and the second channel profile, a second incremental probability of conversion associated with delivering the first message via the second delivery channel;
select, based at least in part on the first incremental probability of conversion and the second incremental probability of conversion, a selected delivery channel; and
cause delivery of the first message via the selected delivery channel.

6. The system of claim 5, wherein the first incremental probability of conversion represents an increase in the likelihood that the first recipient will perform an action associated with the first message.

7. The system of claim 5, wherein the hardware processor is further configured to:
obtain, from the profile data store, a second recipient profile corresponding to a second recipient,
wherein the second incremental probability of conversion is determined based at least in part on the second recipient profile.

8. The system of claim 7, wherein the first incremental probability of conversion is associated with delivering the first message to the first recipient via the first delivery channel, and wherein the second incremental probability of conversion is associated with delivering the first message to the first recipient via the second delivery channel.

9. The system of claim 8, wherein the hardware processor is further configured to:
determine, based at least in part on the first message profile, the first channel profile, and the second recipient profile, a third probability of conversion associated with delivering the first message to the second recipient via the first delivery channel; and
determine, based at least in part on the first message profile, the second channel profile, and the second recipient profile, a fourth probability of conversion associated with delivering the first message to the second recipient via the second delivery channel,
wherein the selected delivery channel is selected based at least in part on the third probability of conversion and the fourth probability of conversion.

10. The system of claim 9, wherein the hardware processor is further configured to:
select, based at least in part on the first incremental probability of conversion, the second incremental probability of conversion, the third incremental probability of conversion, and the fourth incremental probability of conversion, a selected recipient,
wherein delivery of the first message via the selected delivery channel comprises delivery of the first message to the selected recipient via the selected delivery channel.

11. The system of claim 5, wherein the hardware processor is further configured to:
obtain, from the message profile data store, a second message profile corresponding to a second message; and
determine, based at least in part on the first message profile and the second message profile, a degree of similarity between the first message and the second message,
wherein the first incremental probability of conversion is determined based at least in part on a prior delivery of the second message via the first delivery channel and on the degree of similarity between the first message and the second message.

12. The system of claim 5 further comprising an impression path data store configured to store impression paths, wherein the hardware processor configured to determine the first incremental probability of conversion is configured to:
obtain, from the impression path data store, a first impression path, the first impression path including at least a previous impression, wherein the previous impression corresponds to a previous delivery of the first message;
determine, based at least in part on the first impression path, a first probability of conversion;
generate a first potential impression, the first potential impression corresponding to delivery of the first message via the first delivery channel;

generate an extended first impression path, the extended first impression path comprising the first impression path and the first potential impression;
determine, based at least in part on the extended first impression path, a second probability of conversion; and
determine the first incremental probability of conversion based at least in part on the first probability of conversion and the second probability of conversion.

13. The system of claim 12, wherein the hardware processor is further configured to store the extended first impression path in the impression path data store.

14. The system of claim 5 further comprising a probability data store configured to store incremental probabilities, wherein the hardware processor is further configured to store the first incremental probability of conversion and the second incremental probability of conversion in the probability data store.

15. The system of claim 5, wherein the first probability of conversion is further based at least in part on at least one of:
a time associated with delivering the first message via the first channel,
a day associated with delivering the first message via the first channel, or
a sequence of impressions in an impression path associated with the first message.

16. A computer-implemented method comprising:
as implemented by a computing device configured with specific executable instructions,
receiving, from a first computing device, a message delivery request, wherein the message delivery request identifies a first message profile and a first channel, and wherein the first message profile is associated with a first message;
obtaining, from a profile data store, a first recipient profile and a second recipient profile, wherein the first recipient profile is associated with a first recipient, and wherein the second recipient profile is associated with a second recipient;
obtaining, from the profile data store, a first channel profile corresponding to a first delivery channel;
determining, based at least in part on the first message profile, the first channel profile, and the first recipient profile, a first incremental probability of conversion associated with delivering the first message to the first recipient;
determining, based at least in part on the first message profile, the first channel profile, and the second recipient profile, a second incremental probability of conversion associated with delivering the first message to the second recipient;
selecting, based at least in part on the first incremental probability of conversion and the second incremental probability of conversion, a selected recipient; and
causing delivery of the first message to the selected recipient.

17. The computer-implemented method of claim 16, wherein determining the first incremental probability of conversion comprises obtaining the first incremental probability of conversion from a probability data store.

18. The computer-implemented method of claim 16, wherein determining the first incremental probability of conversion comprises:
obtaining a first impression path;
determining a first probability of conversion based at least in part on the first impression path;
generating a first potential impression, the first potential impression associated with delivery of the first message to the first recipient;
generating an extended impression path based at least in part on the first potential impression;
determining a second probability of conversion based at least in part on the extended impression path; and
determining the first incremental probability of conversion based at least in part on the first probability of conversion and the second probability of conversion.

19. The computer-implemented method of claim 18, wherein the first impression path includes at least a previous impression.

20. The computer-implemented method of claim 16, wherein the first incremental probability of conversion is associated with a first channel, wherein the second incremental probability of conversion is associated with a second channel, the method further comprising:
selecting, based at least in part on the first incremental probability of conversion and the second incremental probability of conversion, a selected channel.

21. A system comprising:
a profile store configured to store message profiles;
a hardware processor in communication with the profile data store, the hardware processor configured to execute specific computer-executable instructions to at least:
receive, from a first computing device, a message delivery request, wherein the message delivery request identifies a first message;
obtain, from the profile data store, a first message profile corresponding to the first message;
obtain, from a first delivery channel, a first bid associated with delivering the first message via the first delivery channel, wherein the first bid is based at least in part on a first incremental probability, and wherein the first incremental probability is determined based at least in part on the first message profile, a first channel profile corresponding to the first delivery channel, and a recipient profile corresponding to a first recipient;
obtain, from a second delivery channel, a second bid associated with delivering the first message via the second delivery channel, wherein the second bid is based at least in part on a second incremental probability, and wherein the second incremental probability is determined based at least in part on the first message profile, a channel profile corresponding to the second delivery channel, and a second recipient profile corresponding to a second recipient;
select, based at least in part on the first bid and the second bid, a selected delivery channel; and
cause delivery of the first message via the selected delivery channel.

22. The system of claim 21, wherein the hardware processor is further configured to:
transmit, to the first delivery channel, a bid request; and
transmit, to the second delivery channel, the bid request.

23. The system of claim 22, wherein the bid request includes at least a portion of the first message profile.

24. The system of claim 21, wherein the first bid is further based at least in part on at least one of a time associated with the delivery of the first message via the first channel, a day associated with the delivery of the first message via the first channel, or a previous delivery of the first message.

* * * * *